United States Patent [19]

Ohm

[11] 4,232,321
[45] Nov. 4, 1980

[54] MULTIPLE BEAM SATELLITE ANTENNA WITH PREFERRED POLARIZATION DISTRIBUTION

[75] Inventor: Edward A. Ohm, Holmdel, N.J.

[73] Assignee: Bell Telephone Laboratories, Incorporated, Murray Hill, N.J.

[21] Appl. No.: 963,461

[22] Filed: Nov. 24, 1978

[51] Int. Cl.² ........................... H01Q 1/28; H01Q 3/26
[52] U.S. Cl. .................................... 343/778; 343/779; 343/DIG. 2; 343/100 PE
[58] Field of Search ................ 343/DIG. 2, 777, 778, 343/779, 781 CA, 853, 854, 100 ST, 100 PE

[56] References Cited

U.S. PATENT DOCUMENTS

| | | | |
|---|---|---|---|
| 3,747,031 | 7/1973 | Ohm | 333/81 B |
| 3,755,760 | 8/1973 | Ohm | 333/183 |

OTHER PUBLICATIONS

Kogelnik & Li, Laser Beams and Resonators; Applied Optics, vol. 5, No. 10, Oct. 1966, pp. 1550-1567.
Chu; Restoring The Orthogonality of Two Polarizations in Radio Communications; BSTJ, vol. 50, No. 9, Nov. 1971, pp. 3063-3069.
Chu et al., Quasi-Optical Polarization Diplexing of Microwaves, BSTJ, vol. 54, No. 10, Dec. 1975, pp. 1665-1680.

Primary Examiner—Eli Lieberman
Attorney, Agent, or Firm—Erwin W. Pfeifle

[57] ABSTRACT

Microwave energy feed elements for launching essentially linearly polarized beams in a satellite communications system are oriented in the satellite's antenna so that the polarization directions of the feed elements form a rim and spoke configuration. The vertical polarizations are arranged to extend radially from a point on the antenna's focal surface which images the point on the surface of the celestial body directly below the satellite. Horizontal polarizations are arranged concentrically about the subsatellite image point. Electromagnetic energy launched from the feed elements will reach the surface of the earth at planes of incidence which are locally vertical and horizontal, thereby minimizing cross-polarization coupling between the orthogonally polarized signals due to such energy passing through precipitation.

7 Claims, 5 Drawing Figures

DOMINANT MODE [TEM$_{00}$]   HIGHER-ORDER MODE [TEM$_{01}$]

MULTIPLE BEAM SATELLITE ANTENNA WITH PREFERRED POLARIZATION DISTRIBUTION

BACKGROUND OF THE INVENTION

1. Field of the Invention

This invention relates to satellite communication system antennas, and more particularly, to satellite antennas having plural feed elements for producing multiple beams.

2. Description of the Prior Art

One well known prior art technique for increasing the communications capacity of a satellite communication system involves the utilization of separate information channels which are isolated from one another by diversity of the direction of polarization of the electromagnetic energy which links the satellite with earth ground stations. In satellite communication systems wherein the launched electromagnetic energy is linearly polarized, maximum isolation is achieved between the channels when such linear polarizations are orthogonal to one another. A problem in the prior art systems relates to cross-talk occurring between orthogonally polarized channels especially when the electromagnetic energy is propagated through an atmosphere containing rain droplets or ice crystals.

The prior art has sought to compensate for the cross-coupling effects of differential attenuation and differential phase shift between the respective information channels by incorporating at the receive station complex restoration apparatus. A differential attenuator having a substantially zero net differential phase shift is described in U.S. Pat. No. 3,747,031 which issued to the present inventor on July 17, 1973. Such an attenuator can be used in conjunction with a differential phase shifter which provides a substantially constant differential phase shift between two orthogonally polarized waves in the same frequency band. A differential phase shifter is disclosed in U.S. Pat. No. 3,755,760 which issued on Aug. 28, 1973 to the present inventor. The theory and mathematics which support the use of a differential phase shifter in combination with a differential attenuator is described in an article entitled "Restoring the Orthogonality of Two Polarizations in Radio Communication Systems, I", by T. S. Chu in *The Bell System Technical Journal*, Vol. 50, No. 9, November 1971, at pages 3063-3069.

It has been determined in the prior art that cross polarization varies with the amount of power radiated in higher order modes. This problem is especially acute in arrangements wherein the antenna feeds operate in more than one common-carrier frequency band. Such plural frequency band operation requires the use of oversized waveguides in the higher frequency bands, thereby rendering the higher frequency bands more susceptible to the excitation of higher order modes. One solution in the prior art to the problem of cross polarization involves the use of a closely spaced wire grid as a quasi-optical polarization diplexer. The wires, which may be copper strips with a thin mylar backing must be oriented in a preferred direction which requires that the wires be perpendicular to the plane of incidence determined by the beam axis and the grid normal. A mathematical analysis and experimental results are disclosed in an article entitled "Quasi-Optical Polarization Diplexing of Microwaves", by T. S. Chu, J. Gans, and W. E. Legg, in *The Bell System Technical Journal*, Vol. 54, No. 10, December 1975, at pages 1665-1680.

In prior art synchronous satellite communication systems which transmit linear orthogonally polarized signals, each of the linear orthogonally polarized signals is aligned at the antenna to transmit the correspondingly polarized signals with an essentially parallel orientation over the entire field of view of the antenna radiating such signals. With such signal transmission, it is only along one line in the field of view where the electromagnetic energy at the receiving stations is oriented in the local vertical plane or orthogonal thereto. The problem remaining in the prior art is to provide an antenna capable of transmitting linear orthogonally polarized radiated electromagnetic energy which is received across the field of view of the antenna so that the electromagnetic energy arriving at any receiving station within the field of view receives such energy oriented in the local vertical plane or orthogonal thereto. Such orientation has been determined to substantially reduce cross-polarization effects due to the electromagnetic energy passing through precipitation.

SUMMARY OF THE INVENTION

It has been determined theoretically and by measurement that the level of cross polarization introduced to orthogonally polarized electromagnetic waves propagating through rain or ice crystals is minimized when the electric field is oriented either perpendicular or parallel to the plane of symmetry of the majority of oblate spheroidal raindrops. Since large oblate spheroidal raindrops are usually oriented with their axis of symmetry approximately parallel to the local gravitational field, this invention solves the foregoing and other problems in the prior art by providing an arrangement wherein electromagnetic energy launched from the individual feed elements on the focal surface of a satellite antenna is essentially linearly polarized, the polarization directions of the beams being oriented so that electromagnetic energy arriving at the receiving stations is oriented in the local vertical plane or orthogonal thereto. This is achieved by orienting the satellite feeds so that their polarization directions on the focal surface of the satellite antenna produce a rim and spoke polarization distribution across the face of the feed element array. The hub of such a rim and spoke distribution is the point on the focal surface which images the point on the surface of the celestial body directly below the satellite. The actual subsatellite point is located where a line connecting the center of the celestial body and the satellite intersects the surface of the celestial body.

It is an aspect of the present invention that radiated electromagnetic energy in higher order modes is advantageously utilized to help achieve the rim and spoke polarization direction distribution. In embodiments of the invention where electromagnetic beams are comprised of the combined illumination of a cluster of such feed elements, the higher modes are utilized to achieve the rim and spoke distribution within each cluster. Thus, all polarizations are inclined toward the central polarization of the beam, and can be resolved into dominant mode components and higher order mode components.

It is another aspect of this invention that the phase differential between the dominant and higher order modes is advantageously utilized to achieve phase reversal.

Other and further aspects of the present invention will become apparent during the course of the following description and by reference to the accompanying drawings.

BRIEF DESCRIPTION OF THE DRAWING

Referring now to the drawings, in which like numerals represent like parts in several views.

DETAILED DESCRIPTION

Figure 1:
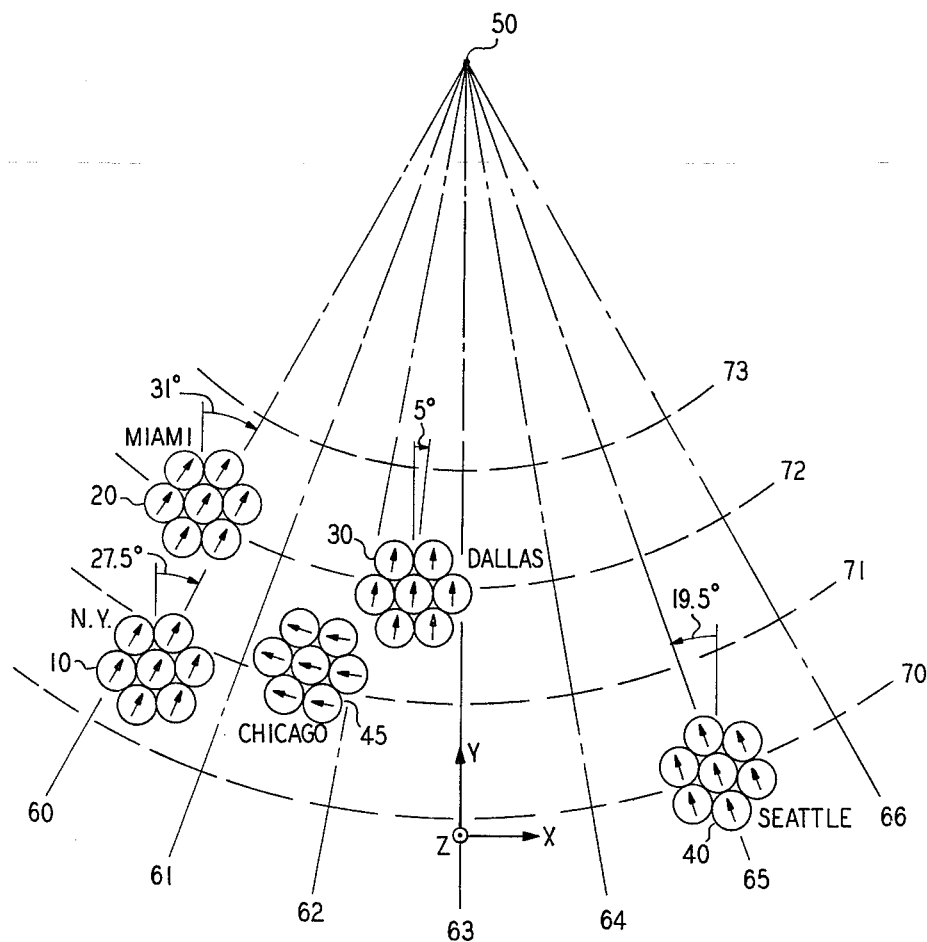
FIG. 1 schematically illustrates a back view of a feed element array configured for illuminating selected parts of the United States.

FIG. 1 is a schematic illustration of a back view of a feed element array disposed on the focal surface of a satellite antenna. For purposes of facilitating comprehension of the invention, only five clusters of feed elements, 10, 20, 30, 40 and 45 are shown. It is to be understood, however, that greater or fewer feed elements may be disposed on the focal surface, and that the beams generated thereby may be produced by greater or fewer feed elements per cluster. In this embodiment of the invention the five feed element clusters are arranged to illuminate specific geographical locations in the United States. Specifically, cluster 10 illuminates New York, cluster 20 illuminates Miami, cluster 30 illuminates Dallas, cluster 40 illuminates Seattle and cluster 45 illuminates Chicago. As will become evident in the discussion of FIG. 2, the specific illustrative embodiment characteristically inverts the image of the target in the far field on the focal surface. Accordingly, cluster 20 which illuminates Miami in the southeastern portion of the United States is situated in the upper left hand portion of the feed element array, and cluster 40 which illuminates Seattle in the northwestern portion of the United States is situated in the lower right hand portion of the array. Point 50 at the top of FIG. 1 corresponds to the subsatellite point, that is, the point on the surface of the earth directly below the satellite.

The arrows contained in the circles representing the various feed elements in clusters 10, 20, 30, 40 and 45, in FIG. 1, are indicative of the nominal polarization direction of the signal being launched by such feed elements. In accordance with the present invention and as shown in FIG. 1, one of the two essentially linear orthogonal polarization directions associated with each feed element of each cluster is aligned parallel to a line which extends radially outward from subsatellite point 50. Solid grid lines 60 through 66, which are radial lines extending from point 50, correspond to an electromagnetic energy polarization direction which is parallel to the vertical plane on the surface of the earth. Dashed arcuate lines 70 through 73 correspond to electromagnetic linear polarization directions which are aligned parallel to the horizon on the earth's surface. Accordingly, feed elements in the array, the polarization directions of which align parallel to either the straight grid lines or the arcuate grid lines, will produce electromagnetic energy beams having polarization directions which will be locally vertical or horizontal, respectively, on the surface of the celestial body.

As is evident from FIG. 1, the fact that the polarizations are canted with respect to one another to provide locally vertical polarizations on the surface of the celestial body does not of necessity mean that the feed element polarizations align with the local vertical axis at the satellite. For example, cluster 10 launches electromagnetic energy which will align with the vertical plane of incidence at New York. However, the feed elements in this specific illustrative embodiment form an angle of approximately 27.5 degrees with the local vertical at the satellite. This angle varies with the position of the respective feed elements throughout the array. Cluster 45 is shown as producing a beam which aligns with the horizontal plane of incidence at Chicago, Ill. The polarization of each feed element in cluster 45 should align with the circumferential grid lines such as lines 70 through 73. It is to be understood that the polarization directions shown for each of the clusters of feed elements is exemplary only and not for purpose of limitation, and that any polarization direction may be chosen. For example, the present array can take the form of that disclosed in U.S. patent application Ser. No. 943,064, filed on Sept. 18, 1978 in the name of the present inventor, wherein certain clusters are assigned to high traffic areas and other overlapping clusters service adjacent low traffic areas using different frequency subbands. In conjunction with the present invention, the high traffic areas can, for example, all use one distribution of polarization, such as radial, and the low traffic areas use the orthogonal distribution of polarization, that is, circumferential.

Figure 2:
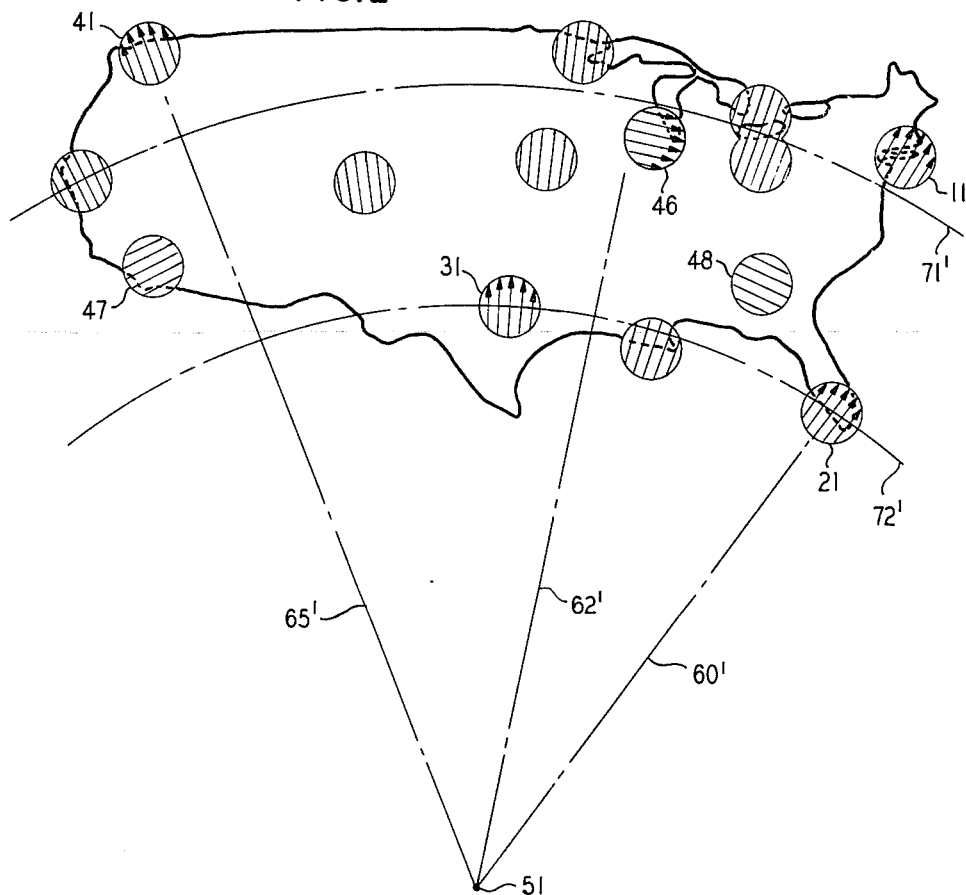
FIG. 2 illustrates a beam illumination pattern produced by the array of FIG. 1 on the continental United States as seen from the satellite.

FIG. 2 is a view of the United States as seen from a satellite. The satellite is situated directly over point 51 on the surface of the earth which corresponds to point 50 on the focal plane representation of FIG. 1. Beam print 11 is a result of the electromagnetic beam launched by cluster 10 in FIG. 1. In similar fashion, beam print 21 corresponds to Miami cluster 20 in FIG. 1, beam print 31 corresponds to Dallas cluster 30, beam print 41 corresponds to Seattle cluster 40 and beam print 46 corresponds to Chicago cluster 45. The figure clearly shows that the polarizations of beam prints 11, 21, 31 and 41 are aligned parallel to radial lines extending from subsatellite point 51. Such radial lines correspond to electromagnetic wave polarizations which are locally vertical.

Beam print 46 is the result of electromagnetic energy waves launched by cluster 45 in FIG. 1. The polarizations of beam print 46 are aligned tangential to circumferential lines whose center is at point 51. Similarly, the polarizations of beam prints 47 and 48 in FIG. 2 are aligned tangential to circumferential lines whose center is at point 51. These beams were generated by feed-element clusters similar to cluster 45 in FIG. 2 (but not shown). The beams which cause beam prints 46, 47 and 48 are polarized so as to align parallel to the local horizon and are therefore orthogonal to the vertical polarizations.

Figure 3:
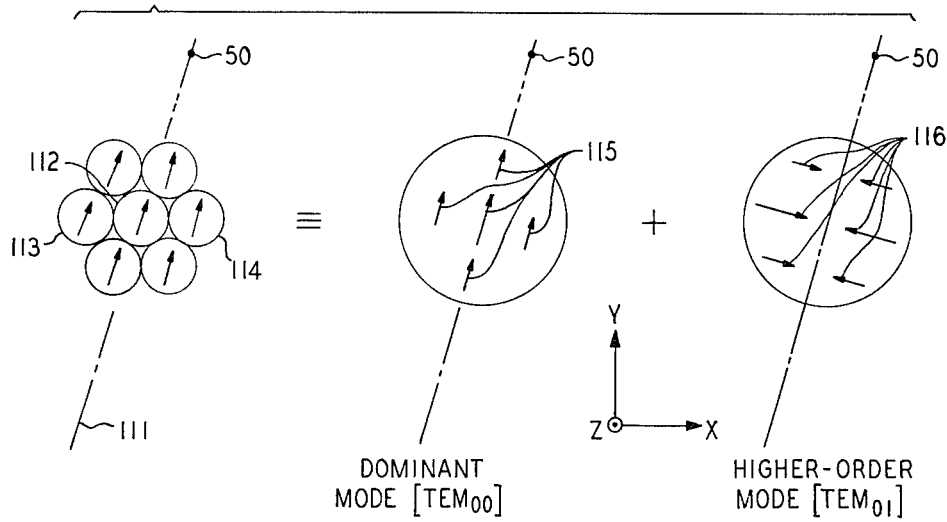
FIG. 3 shows the dominant mode and higher order mode components distributed within a cluster of feed elements.
Figure 4:
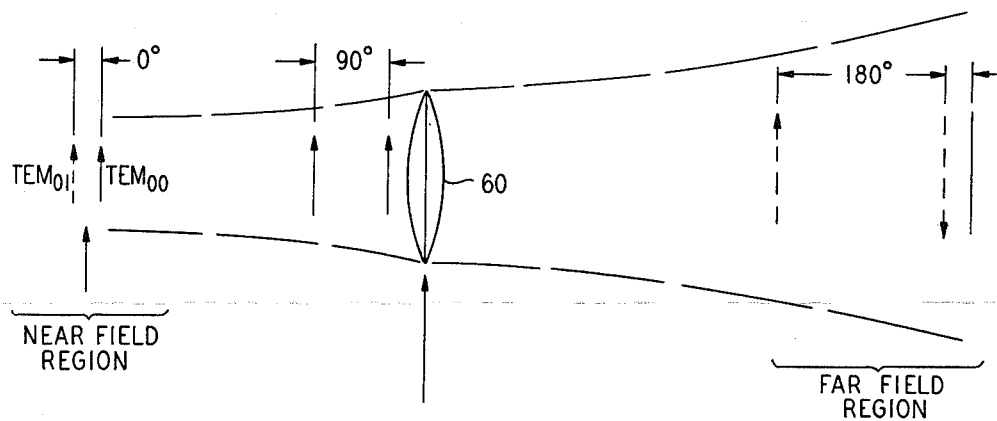
FIG. 4 is a schematic representation of the phase shifts occuring in the satellite antenna beam, and the main reflector is represented by a hypothetical equivalent lens.

FIG. 3 shows in an expanded manner how a typical cluster, illustratively cluster 10, is comprised of feed elements, the polarization orientations of which are inclined with respect to each other. The polarizations of the peripheral feed elements are inclined toward the central polarization of the beam, as indicated by axis 111. The figure shows that central feed element 112 is polarized so as to align with axis 111. Feed element 113, however, is oriented so that its polarization is very slightly inclined toward the central axis, in an opposite direction of the inclination to feed element 114. The composite polarization of the overall beam produced by cluster 10 can be resolved into dominant mode components 115 and, for example, higher order mode components 116. Methods of mathematical analysis known to persons skilled in the art and described in an article entitled "Laser Beams and Resonators", by H. Kogelnik and T. Li, *Applied Optics,* October 1966, indicate that the phase front of the higher mode lags that of the dominant mode by 90 degrees in the far field of the feed. In embodiments of the invention where an antenna of the well known offset Cassegranian type is utilized, the radiation from a feed, including an intermediate reflection from a subreflector and radiation from a main reflector, results in a total phase lag of 180 degrees. Such a lag is equivalent to a zero degree lag combined with reversal of the higher order mode. FIG. 4 illustrates that electromagnetic energy initiating at a feed in the near field region and propagating through a lens 60 which is the equivalent of the two antenna reflectors results in the $TEM_{01}$ mode lagging the $TEM_{00}$ mode by 180 degrees in the far field of the main reflector.

Figure 5:
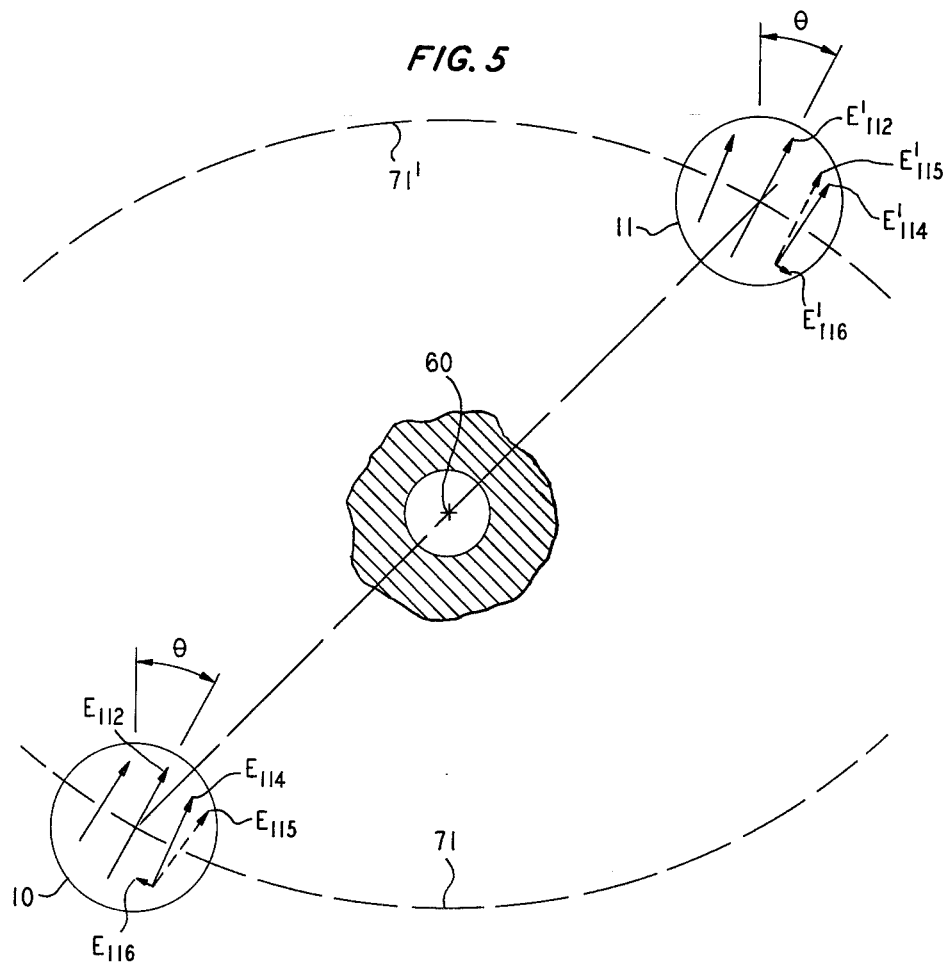
FIG. 5 schematically illustrates the effect of phase reversal of the higher order modes on the polarization directions of a beam as it is propagated through a hypothetical equivalent lens representing the main reflector of the antenna.

FIG. 5 illustrates how the higher order modes described above in connection with FIGS. 3 and 4 are utilized to achieve inclination of the polarization direction in the outer edges of a beam toward the beam's central polarization. Dashed line 71 in FIG. 5 corresponds to local horizontal planes on the earth's surface as seen at the focal plane, as shown by line 71 in FIG. 1. Dashed line 71' in FIG. 5 corresponds to the local horizontal plane in the far field as shown by line 71' in FIG. 2. For purposes of illustrating the effects of higher order mode phase reversal in FIG. 5, cluster 10 is shown in the near field region in the lower left hand portion of the figure. Cluster 10 is that cluster shown in FIG. 2 which launches an electromagnetic energy beam to New York, and is depicted in terms of mode components in FIG. 3.

Suppose the principle E-field polarization of the center element 112 in FIG. 3 is inclined by an angle $\theta$ as shown by $E_{112}$ in the lower left of FIG. 5, $\theta$ being approximately 27.5 degrees, as noted in connection with FIG. 1. Then, the principle E-field polarization of a feed element to the right of the center element, such as feed element 114 in FIG. 3, is inclined toward $E_{112}$ as shown by $E_{114}$ in FIG. 5. $E_{114}$ is comprised of parallel and perpendicular energy components $E_{115}$ and $E_{116}$, respectively. $E_{115}$ is associated with the dominant mode, $TEM_{00}$, as shown by components 115 of FIG. 3, and $E_{116}$ is associated with a higher order mode, $TEM_{01}$ as shown by the components 116 of FIG. 3. Beam print 11 in the far field of FIG. 5 corresponds to beam print 11 covering the New York area in FIG. 2. As a result of the higher order mode phase reversal discussed in connection with FIG. 4, $E_{116}$ in the near field region of FIG. 5 is reversed in direction as indicated by $E'_{116}$ in the far field. Consequently, $E_{114}$, which in the near field is inclined toward $E_{112}$, is slightly rotated in the far field so as to be inclined outward from $E'_{112}$, as indicated by $E'_{114}$ in the far field. The inclination of $E'_{112}$ with respect to the vertical plane by the angle $\theta$, remains unchanged in the far field. Thus, central polarization vector $E'_{112}$ in the far field deviates from the vertical plane by an angle $\theta$, as viewed from a synchronous satellite, but is locally vertical on the surface of the earth. Persons skilled in the art can apply the above teachings to achieve polarization vector directions which align substantially parallel to circumferential lines 71', 72', etc., and are, therefore, locally horizontal on the surface of the earth.

It should be understood that in practicing this invention, the sequence described in connection with FIG. 5 is reversed. The preferred polarization distribution and the desired beam directions, as seen in the upper right hand portion of FIG. 5, are first determined from the satellite to earth geometry. Subsequently, the scale for the array dimensions is determined to allow approximate sizing of an array feed, and the approximate determination of the polarizations of feed elements contributing to each beam of interest, as shown in FIG. 1.

The hereinabove described exemplary embodiment is illustrative of the application of the principles of the invention. It is to be understood that, in light of this teaching, numerous other arrangements may be devised by persons skilled in the art without departing from the spirit and scope of the invention.

I claim:

1. In a satellite communications system, a method of transmitting electromagnetic energy from a satellite to a remote receiving area on the surface of a celestial body which results in a reduced amount of cross-polarization coupling along the transmission path, the satellite being in orbit directly above a subsatellite point (51) on the celestial body and comprises an antenna arrangement comprising (a) at least a main reflector aperture, a feed and a focal surface disposed transversely about the feed axis, the focal surface being comprised of a plurality of focal points, each of which corresponds to a respective point in the remote receiving area and a projection of the subsatellite point (50) on the focal surface and (b) plural feed elements disposed on the focal surface, the method comprising the step of:
    (a) energizing one or more feed elements (e.g., 113, 114) for transmitting at least one beam of electromagnetic energy comprising any combination of a first and a second direction of essentially linear polarization which are orthogonal to one another toward the portions of the receiving area on the celestial body associated with the particular points on the focal surface where the energized feed elements are disposed,

CHARACTERIZED IN THAT the method comprises the further step of:
    (b) in performing step (a), energizing the one or more feed elements for transmitting the at least one beam of electromagnetic energy so that when the first direction of polarization is used by any particular one of the energized feed elements, the first direction is aligned parallel to a line on the focal surface connecting the corresponding subsatellite point and the point where the particular feed element is disposed (60-66), and when the second direction of polarization is used by any particular one of the feed elements, the second direction is aligned orthogonal to the line on the focal surface connecting the corresponding subsatellite point and the point on the focal surface where the particular feed element is disposed (70-73).

2. The method of claim 1

CHARACTERIZED IN THAT
the method comprises the further step of:
(c) in performing step (b), producing the at least one beam of electromagnetic energy from the combined energies produced by a separate cluster (e.g., 10) of adjacent feed elements (e.g., 113, 112, 114) for each beam, each of which feed elements being energized to produce energy in dominant (115) and higher order (116) modes of operation and aligned with any combination of the first and second polarization directions.

3. The method of claim 2 wherein the feed elements are disposed in a near field region close to the focal surface of the antenna, and launch electromagnetic energy to a distant target in a far field of the antenna
CHARACTERIZED IN THAT
the method comprises the further step of:
(d) in performing step (c), arranging the feed elements with respect to the antenna structure to achieve selectable amounts of phase shifts to preselected ones of the modes of operation in the far field of the antenna with respect to the phase of such modes in the near field of the antenna.

4. The method of claim 3
CHARACTERIZED IN THAT
the method comprises the further step of:
(e) in performing step (d), arranging the feed elements with respect to the antenna structure to achieve phase reversal of selectable ones of the higher order modes of operation in the far field of the antenna (e.g., $E'_{116}$) with respect to the phase of such higher order modes in the focal region of the antenna (e.g., $E_{116}$) to achieve alignment in the far field of the polarization direction of the composite electromagnetic beam with any combination of locally vertical and horizontal planes of incidence at the receiving area on the celestial body in the far field.

5. In a satellite communication system of the type wherein a predetermined zone on the surface of a celestial body in the far field is illuminated by a plurality of electromagnetic energy beams produced by an array of feed elements disposed near the focal surface of a satellite antenna, adjacent ones of which feed elements illuminate respectively associated contiguous areas within the predetermined zone and capable of launching electromagnetic energy in any combination of first and second essentially linear, orthogonal directions of polarization, an arrangement for producing a plurality of composite beams, each of which is composed of the combined illumination of a cluster (e.g., 10) of plural, adjacent feed elements (e.g., 113, 112, 114),
CHARACTERIZED IN THAT
the arrangement comprises
means capable of energizing each feed element in a cluster (e.g., 10) to launch a respective beam of electromagnetic energy so that when the first direction of polarization is used by any particular one of the energized feed elements, the first direction is aligned parallel to a line on the focal surface connecting an image of a subsatellite point directly below the satellite and the point where the particular feed element is disposed (e.g., 60), and when the second direction of polarization is used by any particular one of the feed elements, the second direction is aligned orthogonal to the line on the focal surface connecting the imaged subsatellite point and the point on the focal surface where the particular feed element is disposed (e.g., 71).

6. The arrangement of claim 5
CHARACTERIZED IN THAT
the arrangement comprises
means in the feed elements for launching electromagnetic energy while operating in both a dominant mode (115) and predetermined ones of higher order modes (116) of operation and aligned with any combination of the first and second polarization directions.

7. The arrangement of claim 6
CHARACTERIZED IN THAT
the arrangement further comprises
means for achieving phase reversal of selectable ones of the higher order modes in the far field ($E'_{116}$) with respect to the phase of such higher order modes in the near field ($E_{116}$) so as to achieve alignment of the directions of polarization in the far field with a selectable combination of locally vertical and horizontal planes of incidence on the predetermined zone.

* * * * *

UNITED STATES PATENT AND TRADEMARK OFFICE
CERTIFICATE OF CORRECTION

PATENT NO. : 4,232,321

DATED : November 4, 1980

INVENTOR(S) : Edward A. Ohm

It is certified that error appears in the above-identified patent and that said Letters Patent is hereby corrected as shown below:

In Claim 1, Column 6, line 34, "feed" should read --feed axis--.

Signed and Sealed this

Twenty-sixth Day of March 1985

[SEAL]

Attest:

DONALD J. QUIGG

Attesting Officer  Acting Commissioner of Patents and Trademarks